United States Patent
Oh et al.

(10) Patent No.: US 12,112,496 B2
(45) Date of Patent: Oct. 8, 2024

(54) METHOD OF PIECEWISE LINEAR SCALING OF GEOMETRY ATLAS AND APPARATUS USING THE SAME

(71) Applicants: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang (KR)

(72) Inventors: Kwan-Jung Oh, Daejeon (KR); Gwang-Soon Lee, Daejeon (KR); Do-Hyeon Park, Gimpo (KR); Jae-Gon Kim, Goyang (KR); Sung-Gyun Lim, Goyang (KR)

(73) Assignees: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang (KR)

( * ) Notice: Subject to any disclaimer, the term of this patent is extended or adjusted under 35 U.S.C. 154(b) by 466 days.

(21) Appl. No.: 17/569,944

(22) Filed: Jan. 6, 2022

(65) Prior Publication Data
US 2022/0215566 A1   Jul. 7, 2022

(30) Foreign Application Priority Data

Jan. 7, 2021   (KR) .................. 10-2021-0002221
Dec. 21, 2021  (KR) .................. 10-2021-0183887

(51) Int. Cl.
*G06T 7/55*    (2017.01)
*G06T 7/536*   (2017.01)
*G06T 9/00*    (2006.01)

(52) U.S. Cl.
CPC ............. *G06T 7/55* (2017.01); *G06T 7/536* (2017.01); *G06T 9/005* (2013.01); *G06T 9/008* (2013.01)

(58) Field of Classification Search
CPC .......... G06T 7/55; G06T 7/536; G06T 9/005; G06T 9/008; G06T 9/001; H04N 19/597
See application file for complete search history.

(56) References Cited

U.S. PATENT DOCUMENTS

| | | | |
|---|---|---|---|
| 10,891,784 B2 | 1/2021 | Dore et al. | |
| 2009/0129667 A1* | 5/2009 | Ho .................. | G06T 15/205 |
| | | | 382/154 |

(Continued)

FOREIGN PATENT DOCUMENTS

| | | | | |
|---|---|---|---|---|
| CN | 103875244 A | * | 6/2014 | ......... H04N 13/0007 |
| CN | 106203283 A | * | 12/2016 | ......... G06K 9/00335 |

(Continued)

OTHER PUBLICATIONS

Jill Boyce et al., "Extensions to Technicolor-Intel Response to 3DoF+CfP," ISO/IEC JTC1/SC29/WG11 MPEG2018/M47544, Mar. 2019.

(Continued)

*Primary Examiner* — Charles T Shedrick

(57) ABSTRACT

Disclosed herein is a method for piecewise linear scaling of a geometry atlas, the method including generating min-max normalized depth values and generating geometry atlases by scaling the depth values so as to correspond to the gradients of multiple linear intervals.

20 Claims, 4 Drawing Sheets

(56) References Cited

U.S. PATENT DOCUMENTS

| | | | |
|---|---|---|---|
| 2014/0056508 A1* | 2/2014 | Lee | G06V 20/64 |
| | | | 382/154 |
| 2014/0218473 A1* | 8/2014 | Hannuksela | H04N 19/30 |
| | | | 348/43 |
| 2015/0245063 A1* | 8/2015 | Rusanovskyy | H04N 19/597 |
| | | | 375/240.12 |
| 2020/0068119 A1* | 2/2020 | Celik | H04N 23/673 |
| 2020/0359000 A1 | 11/2020 | Shin et al. | |
| 2021/0006764 A1 | 1/2021 | Shin et al. | |
| 2021/0006830 A1 | 1/2021 | Yun et al. | |
| 2022/0215566 A1* | 7/2022 | Oh | G06T 9/001 |
| 2023/0186522 A1* | 6/2023 | Dore | H04N 19/21 |
| | | | 345/419 |
| 2023/0386057 A1* | 11/2023 | Kim | G06T 5/20 |

FOREIGN PATENT DOCUMENTS

| | | | | |
|---|---|---|---|---|
| CN | 114494208 A | * | 5/2022 | |
| EP | 2230856 A2 | * | 9/2010 | G06T 3/40 |
| KR | 10-2013-0023049 A | | 3/2013 | |
| KR | 1020210036795 A | | 4/2021 | |

OTHER PUBLICATIONS

Adrian Dziembowski et al., "Immersive Video CE1.2: Geometry scaling," ISO/IEC JTC1/SC29/WG11 MPEG2020/M54176, Jun. 2020.

B. Salahieh et al., "Test Model 7 for Immersive Video," ISO/IECJTC1/SC29/WG4, N0005, Oct. 2020.

Basel Salahieh et al., "Test Model 6 for MPEG Immersive Video", ISO/IEC JTC 1/SC 29/WG 11, N19483, Jul. 2020.

* cited by examiner

METHOD OF PIECEWISE LINEAR SCALING OF GEOMETRY ATLAS AND APPARATUS USING THE SAME

CROSS REFERENCE TO RELATED APPLICATIONS

This application claims the benefit of Korean Patent Application No. 10-2021-0002221, filed Jan. 7, 2021, and No. 10-2021-0183887, filed Dec. 21, 2021, which are hereby incorporated by reference in their entireties into this application.

BACKGROUND OF THE INVENTION

1. Technical Field

The present invention relates generally to encoding and decoding of immersive video, and more particularly to encoding and decoding of geometry atlases that correspond to depth information representing 3D information in immersive video.

2. Description of the Related Art

These days, with the explosive interest in realistic content and development of broadcast devices and image transmission technology, the move to actively use realistic content is increasing in various fields related to multimedia, such as movies, TV, and the like.

Immersive video provides viewers with images from multiple viewpoints such that the viewers are able to experience natural motion parallax, but has a disadvantage in that it is necessary to store a huge amount of image data for the multiple views.

In order to provide immersive video, an imaging device has to capture images from multiple viewpoints and provide the images captured from the multiple viewpoints. As the number of images captured from different viewpoints increases, there is an advantage in that high-quality 3D content can be generated, but a transmission bandwidth problem may be caused because it is necessary to additionally transmit the increased number of images when transmission is performed. Also, there is a disadvantage in that high-quality images from multiple viewpoints require a greater amount of storage space.

Geometry information is depth information representing 3D information in MPEG immersive video, and is generally represented as a 2D image of a single channel.

Such geometry information is represented as a geometry atlas in which redundancy between views is eliminated from multi-view geometry.

A geometry image represented as atlases is compressed using a 2D image codec.

An MPEG immersive video encoder represents depth information of multiple views using atlases, thereby performing encoding. An MPEG immersive video decoder decodes geometry atlases and uses the same in order to generate a virtual view image through view synthesis or the like.

That is, a geometry may be considered to be the representation of depth or disparity information in the form of a 2D image, and is image information that is simpler than a texture image. The geometry is used as 3D information when a virtual view image is generated through rendering. Particularly, geometry has greater importance on the boundary of an object, and the geometry corresponding to the boundary of the object strongly affects rendering quality.

Therefore, new technology for efficiently encoding/decoding a geometry atlas while minimizing an increase in the amount of encoding data in MPEG immersive video is urgently required.

SUMMARY OF THE INVENTION

An object of the present invention is to maximize the image quality of immersive video while minimizing compression performance loss by representing a geometry based on importance.

Another object of the present invention is to represent geometry information with different degrees of data representation accuracy (or different scales) in multiple regions depending on importance, thereby maximizing the efficiency of encoding/decoding of immersive video.

A further object of the present invention is to represent a geometry atlas with different degrees of data representation accuracy in multiple regions depending on importance while minimizing the amount of syntax information that has to be transmitted/received therefor.

In order to accomplish the above objects, a method for piecewise linear scaling of a geometry atlas according to the present invention includes generating min-max normalized depth values; and generating geometry atlases by scaling the depth values so as to correspond to the gradients of multiple linear intervals.

Here, the method may be performed in an immersive video encoder.

Here, the linear intervals may be generated by dividing an entire range corresponding to the min-max normalized depth values into equal intervals.

Here, the method may further include generating an encoded immersive video signal using the geometry atlases.

Here, the gradients may be set based on sample occurrence frequencies in the linear intervals.

Here, each of the gradients may be set higher as the sample occurrence frequency is higher.

Here, the sample occurrence frequencies may be clipped into a predetermined range.

Here, the linear intervals may be signaled using syntax fields including a first field (dq_interval_num) indicating the number of linear intervals and a second field (dq_norm_disp_pivot) indicating a scaled value corresponding to each of the linear intervals.

Here, the syntax fields may further include a third field (dq_scaled_disp_start) indicating a start depth value to which the piecewise linear scaling is applied.

Also, a method for inverse scaling of a geometry atlas according to an embodiment of the present invention includes restoring geometry atlases; and generating min-max normalized depth values by performing inverse scaling on the geometry atlases so as to correspond to the gradients of multiple linear intervals.

Here, the method may be performed in an immersive video decoder.

Here, the linear intervals may be generated by dividing an entire range corresponding to the min-max normalized depth values into equal intervals.

Here, the method may further include generating a virtual view image using the min-max normalized depth values.

Here, the gradients may be set based on sample occurrence frequencies in the linear intervals.

Here, each of the gradients may be set such that more bits are assigned as the sample occurrence frequency is higher.

Here, the linear intervals may be signaled using syntax fields including a first field (dq_interval_num) indicating the number of linear intervals and a second field (dq_norm_disp_pivot) indicating a scaled value corresponding to each of the linear intervals.

Here, the syntax fields may further include a third field (dq_scaled_disp_start) indicating a start depth value to which piecewise linear scaling is applied.

Also, an apparatus for piecewise linear scaling of a geometry atlas according to an embodiment of the present invention includes memory in which at least one program is recorded; and a processor for executing the program. Here, the program includes instructions for performing generating min-max normalized depth values; and generating geometry atlases by scaling the depth values so as to correspond to the gradients of multiple linear intervals.

Here, the linear intervals may be generated by dividing an entire range corresponding to the min-max normalized depth values into equal intervals.

Here, the gradients may be set based on sample occurrence frequencies in the linear intervals.

Here, each of the gradients may be set higher as the sample occurrence frequency is higher.

Here, the linear intervals may be signaled using syntax fields including a first field (dq_interval_num) indicating the number of linear intervals and a second field (dq_norm_disp_pivot) indicating a scaled value corresponding to each of the linear intervals.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
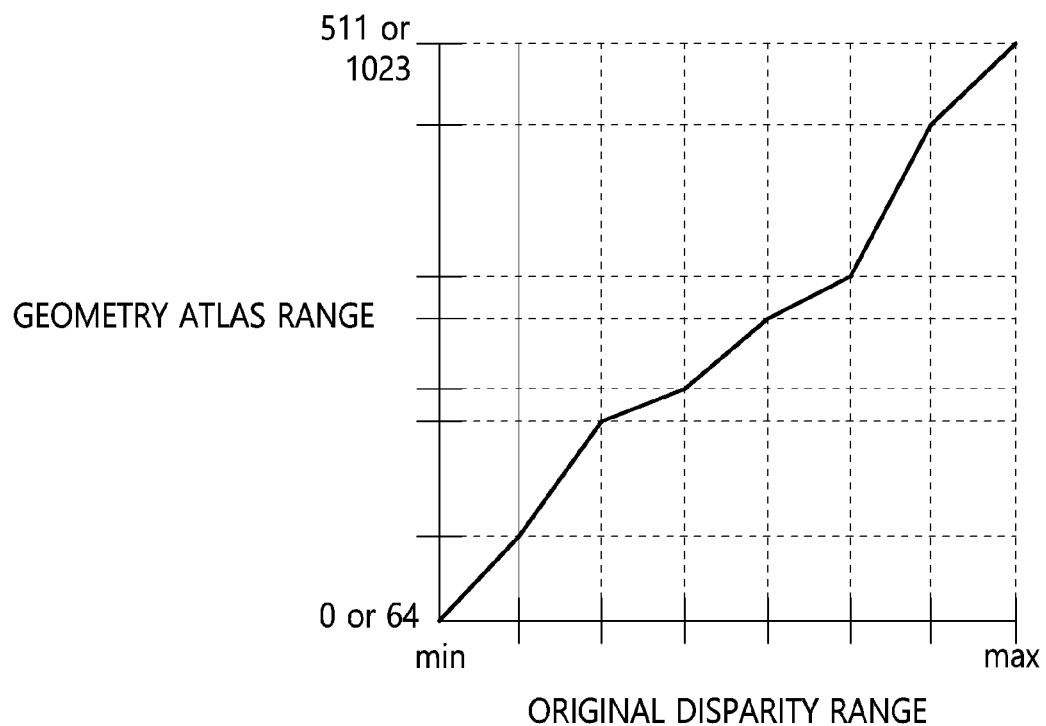
FIG. 1 is a graph illustrating piecewise linear scaling of a geometry atlas according to an embodiment of the present invention.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

Hereinafter, depth may be a concept encompassing disparity. That is, all expressions represented as a depth or a depth value hereinbelow may be replaced with a disparity or a disparity value.

FIG. 1 is a graph illustrating piecewise linear scaling of a geometry atlas according to an embodiment of the present invention.

Referring to FIG. 1, it can be seen that min-max normalized depth values are scaled using multiple piecewise linear intervals.

According to an embodiment, a geometry atlas may generally have a 16-bit depth, but may be generated in a downscaled format for 10-bit video coding.

Here, the min-max normalized depth values may be scaled to a range from {0, 64} to {511, 1023}. That is, the min-max normalized depth values may be scaled to a range from 0 to 511, a range from 0 to 1023, a range from 64 to 511, or a range from 64 to 1023.

Loss of depth information may be incurred by this downscaling in the generation of a geometry atlas. Further, loss of depth information may be incurred by lossy coding of depth atlases. The method for piecewise linear scaling of a geometry atlas according to an embodiment of the present invention may redistribute bits to geometry codewords using piecewise linear scaling in order to reduce the loss of depth information.

The specific process by which a depth atlas is generated as min-max normalized values is described in detail in "Test Model 7 for Immersive Video," ISO/IEC JTC1/SC29/WG4, N0005, written by B. Salahieh, B. Kroon, J. Jung, A. Dziembowski, et al. and published in October, 2020.

The entire range of the min-max normalized depth values is divided into a predetermined number of equal intervals. Here, each interval is adaptively scaled depending on the frequency of depth samples in the atlas. Specifically, a scaled depth range corresponding to a specific interval may be adaptively set depending on the frequency of occurrence of the depth samples included in the specific interval.

In FIG. 1, the original depth value of each interval is mapped to the scaled depth range corresponding to the interval. Then, the geometry atlases are generated as 10-bit depth representations.

Piecewise linear scaling may be defined as follows:

$$d' = (b2_i - b1_i)/(a2_i - a1_i) * (d - a1_i) + b1_i,$$

Here, d denotes the depth value to be scaled, i denotes the interval index of d, and $a1_i$ and $a2_i$ denote the minimum and maximum depths in the i-th interval on the original depth range. Here, $b1_i$ and $b2_i$ denote the minimum and maximum depths in the i-th interval on the scaled depth range.

Inverse scaling may be required in order to perform rendering on the decoder side, and may be performed in the reverse manner from (forward) scaling.

In order to apply the proposed piecewise linear scaling, the number of linear intervals and the depth values of all scaled intervals may be signaled. As will be described below, this information may be signaled by setting the value of the syntax element 'dq_quantization_law' to 1.

In FIG. 1, the case in which the number of linear intervals is seven is given as an example, but the technical spirit of the present invention is not limited thereto. For example, the number of linear intervals may be 16.

A piecewise linear scaling model may be induced on the encoder side. Here, depending on the importance of the depth values in an interval in terms of the rendered view quality, scaling of each interval may be applied. For example, in the method for piecewise linear scaling according to an embodiment of the present invention, more codewords are assigned to depth intervals that have more frequent occurrence of depth values. Further, because depth information pertaining to regions near an object is likely to be more important in terms of rendering view quality, more codewords may be assigned to depth intervals in which samples in the vicinity of the object are included in the method for piecewise linear scaling according to an embodiment of the present invention. Here, the method for piecewise linear scaling according to an embodiment of the present invention may be applied both to a basic view and to additional views.

For example, a piecewise linear model may be induced as follows.

Step 1) An original depth range is divided into N equal sections (intervals). (N is a natural number such as 7 or 16.)

Step 2) The percentage of sample occurrence is calculated in each depth interval, and the occurrence frequency is clipped into a predetermined range such as [1/32, 1/8] in order to avoid over-aggressive assignment.

Step 3) The interval range is adjusted based on the statistical result obtained in Step 2.

Table 1 below is a table illustrating an example of fields signaled for piecewise linear scaling of a geometry atlas according to an embodiment of the present invention.

TABLE 1

|  | Descriptor |
|---|---|
| depth_quantization( viewID ) { |  |
|   dq_quantization_law[ viewID ] | u(8) |
|   if( dq_quantization_law[ viewID ] == 0 ) { |  |
|     dq_norm_disp_low[ viewID ] | fl(32) |
|     dq_norm_disp_high[ viewID ] | fl(32) |
|   } |  |
|   else if( dq_quantization_law[ viewID ] == 1 ) { |  |
|     dq_norm_disp_low[ viewID ] | fl(32) |
|     dq_norm_disp_high[ viewID ] | fl(32) |
|     dq_num_piece_minus1 [ viewID] | u(8) |
|     dq_scaled_disp_start [ viewID] |  |
|     for( i = 0; i <= dq_num_piece[ viewID]; i++ ) |  |
|       dq_scaled_disp_range[ viewID ][ i ] | fl(32) |
|   } |  |
|   if( vme_embedded_occupancy_enabled_flag ) |  |
|     dq_depth_occ_threshold_default[ viewID ] | ue(v) |
| } |  |

Referring to Table 1 above, it can be seen that information for piecewise linear scaling is signaled when the value of the syntax element of dq_quantization_law is set to 1 in the syntax for signaling depth quantization. Here, dq_quantization_law[viewID] indicates the type of depth quantization method of the view having a view ID of viewID. Here, when the value of dq_quantization_law is 0, uniform quantization may be applied to depth values. Here, when the value of dq_quantization_law is 1, piecewise linear scaling of a geometry atlas according to an embodiment of the present invention may be applied.

Here, dq_norm_disp_low[viewID] and dq_norm_disp_high[viewID] may respectively indicate the minimum normalized depth value of the view having a view ID of viewID (min in FIG. 1) and the maximum normalized depth value thereof (max in FIG. 1).

Here, dq_num_piece_minus1[viewID] indicates a value acquired by subtracting 1 from the number of linear intervals for piecewise linear scaling of the view having a view ID of viewID. Alternatively, syntax obtained by subtracting a natural number equal to or greater than 2 from the number of linear intervals, rather than dq_num_piece_minus1, may be encoded/decoded. Here, information for specifying the number of linear intervals, such as the dq_num_piece_minus1 field, may correspond to the first field in the claims. According to an embodiment, the first field may be dq_num_piece, in which case dq_num_piece may indicate the number of linear intervals itself. According to an embodiment, the first field may be signaled based on information indicating the number of linear intervals for piecewise linear scaling, to which any of different natural numbers is added or from which any of different natural numbers is subtracted depending on the circumstances.

Here, dq_scaled_disp_start[viewID] indicates the start depth value for piecewise linear scaling of the view having a view ID of viewID. According to an embodiment, dq_scaled_disp_start[viewID] may not be signaled. When signaling of the value of dq_scaled_disp_start is skipped, the start depth value for piecewise linear scaling may be inferred to be the same value as the value of dq_norm_disp_low. When dq_scaled_disp_start[viewID] is signaled separately from dq_norm_disp_low[viewID], the interval to which piecewise linear scaling is applied may be set more freely. Here, information indicating the start depth value for piecewise linear scaling, such as the dq_scaled_disp_start field, may correspond to the third field in the claims.

Here, dq_scaled_disp_range[viewID][i] may indicate the range of the i-th linear interval for piecewise linear scaling of the view having a view ID of viewID. For example, dq_scaled_disp_range[viewID] [i] may indicate the maximum value of the scaled depth value in the i-th interval, the minimum value thereof, or the difference between the maximum value and the minimum value. Here, dq_scaled_disp_range[viewID][i] is defined in a for loop iterated a number of times equal to the number of linear intervals such that the upper limits on the scaled depth values of the respective linear intervals are signaled, whereby the intervals of the scaled depth ranges may be represented with the minimum possible amount of information. In another example, signaling of dq_scaled_disp_range for the first interval (i.e., i is 0) or the last interval (i.e., i is dq_num_piece_minus1+1) may be skipped. Here, information indicating the range of the i-th linear interval, such as the dq_scaled_disp_range field, may correspond to the second field in the claims.

Here, dq_num_piece, which is the variable used for setting the condition for the for loop in Table 1 above, may correspond to dq_num_piece_minus1+1.

Table 2 below is a table illustrating another example of fields signaled for piecewise linear scaling of a geometry atlas according to an embodiment of the present invention. Compared to the embodiment of Table 1, encoding/decoding of information indicating the start depth value for piecewise linear scaling is excluded. In this case, the minimum value of the normalized depth value (that is, dq_norm_disp_low) may be set as the minimum value of the depth for which piecewise linear scaling is performed.

TABLE 2

```
else if ( dq_quantization_law[ viewID ] == 1 ) {
    dq_norm_disp_low[viewID]
    dq_norm_disp_high[viewID]
    dq_interval_num [ viewID ]
    for(i=0;i<=dq_interval_num [ viewID ];i++)
        dq_norm_disp_pivot[viewID][ i ]
}
```

Here, dq_quantization_law[viewID] indicates the type of depth quantization method of the view having a view ID of viewID. Here, when the value of dq_quantization_law is 0, uniform quantization may be applied to depth values. Here, when the value of dq_quantization_law is 1, piecewise linear scaling of a geometry atlas according to an embodiment of the present invention may be applied. Here, dq_norm_disp_low[viewID] and dq_norm_disp_high[viewID] respectively indicate the minimum normalized depth value of the view having a view ID of viewID (min in FIG. 1) and the maximum normalized depth value thereof (max in FIG. 1).

Here, dq_interval_num[viewID] indicates the number of linear intervals for piecewise linear scaling of the view having a view ID of viewID. Here, the dq_interval_num field may correspond to the first field in the claims.

Here, dq_norm_disp_pivot[viewID] [i] indicates the i-th pivot in the piecewise-linear-scaled domain of the view having a view ID of viewID or the normalized depth or the disparity value of the linear interval. Here, dq_norm_disp_pivot[viewID] [i] may indicate the scaled depth value (upper limit) of the i-th linear interval for piecewise linear scaling of the view having a view ID of viewID. Here, dq_norm_disp_pivot[viewID] [i] is defined in a for loop iterated a number of times equal to the number of intervals such that the upper limits on the scaled depth values of the respective linear intervals are signaled, whereby the intervals of the scaled depth ranges may be represented with the minimum possible amount of information. Here, the dq_norm_disp_pivot field may correspond to the second field in the claims. Here, a value acquired by subtracting 1 from the total number of dq_norm_disp_pivot[viewID] [i] may be equal to dq_interval_num[viewID].

Figure 2:
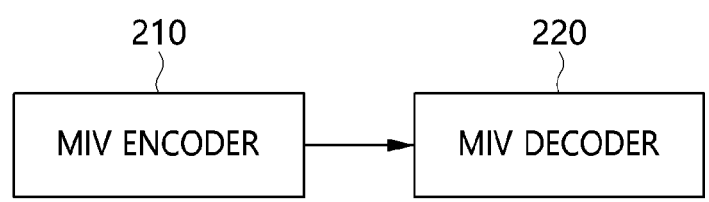
FIG. 2 is a block diagram illustrating an immersive video system according to an embodiment of the present invention.

FIG. 2 is a block diagram illustrating an immersive video system according to an embodiment of the present invention.

Referring to FIG. 2, the immersive video system according to an embodiment of the present invention includes an immersive video encoder 210 and an immersive video decoder 220.

Here, the immersive video encoder 210 may be an MPEG immersive video encoder, and the immersive video decoder 220 may be an MPEG immersive video decoder.

The immersive video encoder 210 performs piecewise linear scaling of a geometry atlas. Here, the immersive video encoder 210 may perform generating min-max normalized depth values and generating geometry atlases by scaling the depth values so as to correspond to the gradients of multiple linear intervals.

The immersive video encoder 210 may perform various functions for encoding immersive video as well as piecewise linear scaling of a geometry atlas.

The immersive video decoder 220 receives encoded immersive video and decodes the same, thereby restoring immersive video.

The immersive video decoder 220 may perform inverse scaling of a geometry atlas. Here, the immersive video decoder 220 may perform restoring geometry atlases and generating min-max normalized depth values by performing inverse scaling on the geometry atlases so as to correspond to the gradients of multiple linear intervals.

The immersive video decoder 220 may perform various functions for decoding immersive video and generating a virtual view image, in addition to inverse scaling of a geometry atlas.

Figure 3:
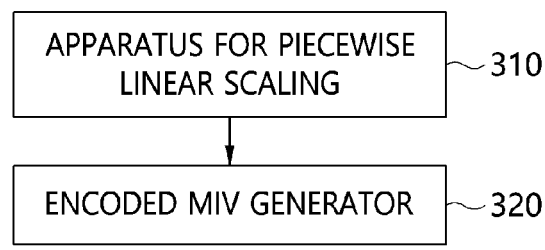
FIG. 3 is a block diagram illustrating an example of the immersive video encoder illustrated in FIG. 2.

FIG. 3 is a block diagram illustrating an example of the immersive video encoder illustrated in FIG. 2.

Referring to FIG. 3, the immersive video encoder illustrated in FIG. 2 may include an apparatus 310 for piecewise linear scaling and an encoded immersive video generator 320.

The apparatus 310 for piecewise linear scaling may generate min-max normalized depth values and scale the depth values so as to correspond to the gradients of multiple linear intervals, thereby generating geometry atlases.

The encoded immersive video generator 320 performs various functions for encoding immersive video.

Figure 4:
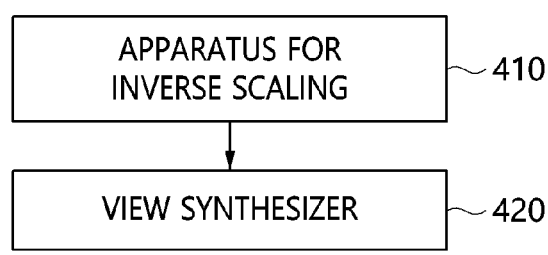
FIG. 4 is a block diagram illustrating an example of the immersive video decoder illustrated in FIG. 2.

FIG. 4 is a block diagram illustrating an example of the immersive video decoder illustrated in FIG. 2.

Referring to FIG. 4, the immersive video decoder illustrated in FIG. 2 may include an apparatus 410 for inverse scaling and a view synthesizer 420.

The apparatus 410 for inverse scaling restores geometry atlases and performs inverse scaling on the geometry atlases so as to correspond to the gradients of multiple linear intervals, thereby generating min-max normalized depth values.

The view synthesizer 420 generates a virtual view image through view synthesis.

Figure 5:
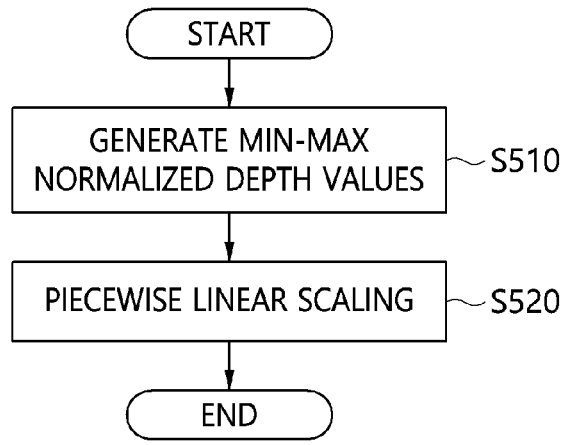
FIG. 5 is a flowchart illustrating a method for piecewise linear scaling of a geometry atlas according to an embodiment of the present invention.

FIG. 5 is a flowchart illustrating a method for piecewise linear scaling of a geometry atlas according to an embodiment of the present invention.

Referring to FIG. 5, in the method for piecewise linear scaling of a geometry atlas according to an embodiment of the present invention, min-max normalized depth values are generated at step S510.

Also, in the method for piecewise linear scaling of a geometry atlas according to an embodiment of the present invention, geometry atlases are generated at step S520 by scaling the depth values so as to correspond to the gradients of multiple linear intervals.

Here, the linear intervals may be generated by dividing the entire range corresponding to the min-max normalized depth values into equal intervals.

Here, the gradients may be set based on sample occurrence frequencies in the linear intervals.

Here, each of the gradients may be set higher as the sample occurrence frequency is higher.

Here, the sample occurrence frequencies may be clipped into a predetermined range.

Here, the linear intervals may be signaled using syntax fields including a first field (dq_interval_num) indicating the number of linear intervals and a second field (dq_norm_disp_pivot) indicating the scaled value corresponding to each of the linear intervals.

Here, the syntax fields may further include a third field (dq_scaled_disp_start) indicating the start depth value to which piecewise linear scaling is applied.

The steps illustrated in FIG. 5 may be performed in the immersive video encoder illustrated in FIG. 2.

Although not explicitly illustrated in FIG. 5, the method for piecewise linear scaling of a geometry atlas according to an embodiment of the present invention may further include generating an encoded immersive video signal using the geometry atlases.

Figure 6:
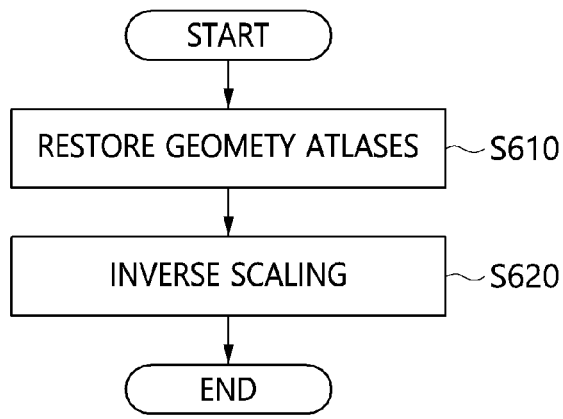
FIG. 6 is a flowchart illustrating a method for inverse scaling of a geometry atlas according to an embodiment of the present invention.

FIG. 6 is a flowchart illustrating a method for inverse scaling of a geometry atlas according to an embodiment of the present invention.

Referring to FIG. 6, in the method for inverse scaling of a geometry atlas according to an embodiment of the present invention, geometry atlases are restored at step S610.

Also, in the method for inverse scaling of a geometry atlas according to an embodiment of the present invention, min-max normalized depth values are generated at step S620 by performing inverse scaling of the geometry atlases so as to correspond to the gradients of multiple linear intervals.

Here, the linear intervals may be generated by dividing the entire range corresponding to the min-max normalized depth values into equal intervals.

Here, the gradients may be set based on the sample occurrence frequencies in the linear intervals.

Here, each of the gradients may be set such that more bits are assigned as the sample occurrence frequency is higher.

Here, the linear intervals may be signaled using syntax fields including a first field (dq_interval_num) indicating the number of linear intervals and a second field (dq_norm_disp_pivot) indicating the scaled value corresponding to each of the linear intervals.

Here, the syntax fields may further include a third field (dq_scaled_disp_start) indicating the start depth value to which piecewise linear scaling is applied.

The steps illustrated in FIG. 6 may be performed in the immersive video decoder illustrated in FIG. 2.

Although not explicitly illustrated in FIG. 6, the method for inverse scaling of a geometry atlas according to an embodiment of the present invention may further include generating a virtual view image using the min-max normalized depth values.

Figure 7:
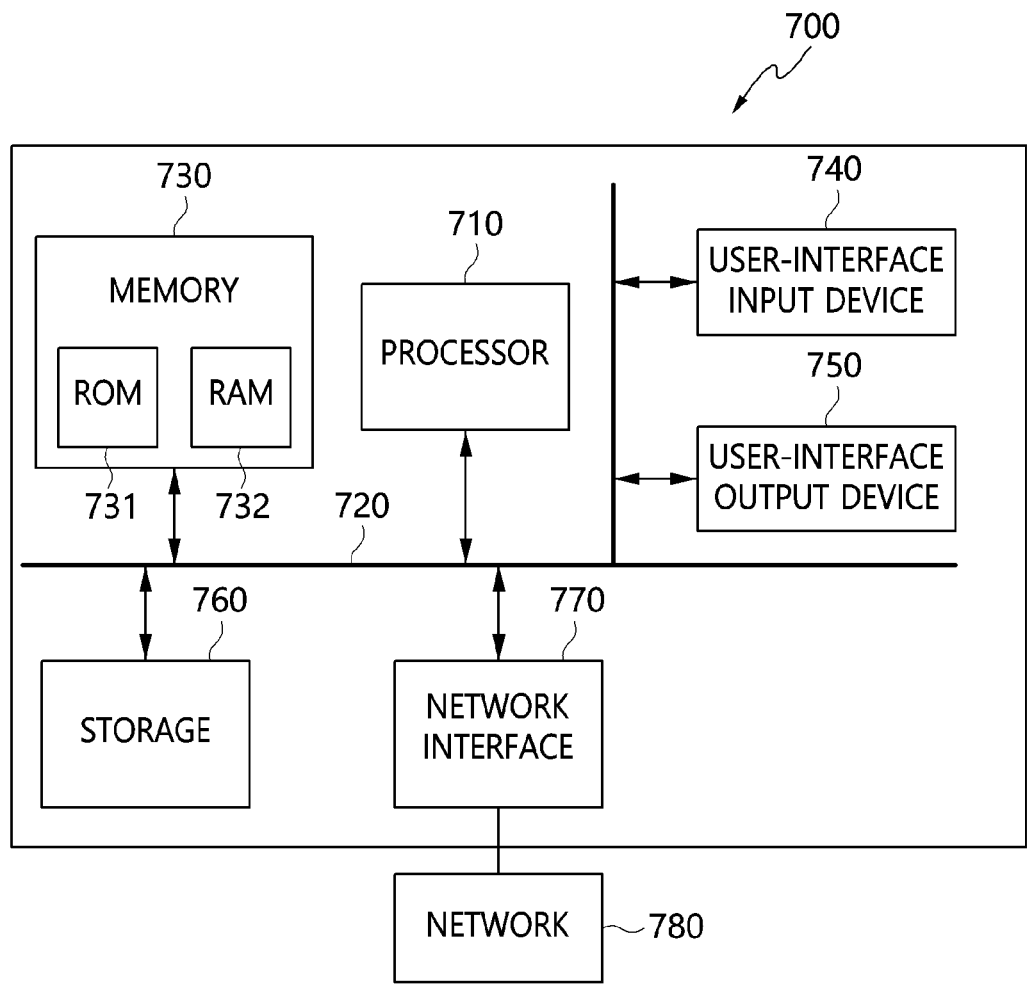
FIG. 7 is a block diagram illustrating a computer system configuration according to an embodiment of the present invention.

FIG. 7 is a block diagram illustrating a computer system configuration according to an embodiment of the present invention.

The apparatus for piecewise linear scaling of a geometry atlas, the apparatus for inverse scaling of a geometry atlas, the encoded immersive video generator, the view synthesizer, the immersive video encoder, and the immersive video decoder according to an embodiment may be implemented in a computer system 700 including a computer-readable recording medium.

The computer system 700 may include one or more processors 710, memory 730, a user-interface input device 740, a user-interface output device 750, and storage 760, which communicate with each other via a bus 720. Also, the computer system 700 may further include a network interface 770 connected to a network 780. The processor 710 may be a central processing unit or a semiconductor device for executing a program or processing instructions stored in the memory 730 or the storage 760. The memory 730 and the storage 760 may be storage media including at least one of a volatile medium, a nonvolatile medium, a detachable medium, a non-detachable medium, a communication medium, and an information delivery medium. For example, the memory 730 may include ROM 731 or RAM 732.

Here, at least one program may be recorded in the memory 730.

Here, the processor 710 may execute the program. Here, the program may include instructions for performing the step of generating min-max normalized depth values and the step of generating geometry atlases by scaling the depth values so as to correspond to the gradients of multiple linear intervals.

Here, the linear intervals may be generated by dividing the entire range corresponding to the min-max normalized depth values into equal intervals.

Here, the gradients may be set based on the sample occurrence frequencies in the linear intervals.

Here, each of the gradients may be set higher as the sample occurrence frequency is higher.

Here, the linear intervals may be signaled using syntax fields including a first field indicating the number of linear intervals and a second field indicating the scaled value corresponding to each of the linear intervals.

According to the method for piecewise linear scaling of a geometry atlas according to an embodiment of the present invention, the loss of depth information is minimized, whereby the efficiency of view synthesis is ensured. The method for piecewise linear scaling of a geometry atlas according to an embodiment of the present invention enables a piecewise linear scaling model to be generated based on the occurrence frequency of a depth value in an additional view.

According to the present invention, a geometry is represented based on importance, whereby the image quality of immersive video may be maximized while compression performance loss may be minimized.

Also, the present invention represents geometry information with different degrees of data representation accuracy (or different scales) in multiple regions depending on importance, thereby maximizing the efficiency of encoding/decoding of immersive video.

Also, the present invention represents a geometry atlas with different degrees of data representation accuracy in multiple regions depending on importance while minimizing the amount of syntax information that has to be transmitted/received therefor.

As described above, the method for piecewise linear scaling of a geometry atlas, the method for inverse scaling thereof, and the apparatuses therefor according to the present invention are not limitedly applied to the configurations and operations of the above-described embodiments, but all or some of the embodiments may be selectively combined and configured, so the embodiments may be modified in various ways.

What is claimed is:

1. A method for piecewise linear scaling of a geometry atlas, performed in an immersive video encoder, comprising:
generating min-max normalized depth values; and
generating geometry atlases by scaling the depth values so as to correspond to gradients of multiple linear intervals.

2. The method of claim 1, wherein:
the linear intervals are generated by dividing an entire range corresponding to the min-max normalized depth values into equal intervals.

3. The method of claim 1, further comprising:
generating an encoded immersive video signal using the geometry atlases.

4. The method of claim 1, wherein:
the gradients are set based on sample occurrence frequencies in the linear intervals.

5. The method of claim 4, wherein:
each of the gradients is set higher as the sample occurrence frequency is higher.

6. The method of claim 4, wherein:
the sample occurrence frequencies are clipped into a predetermined range.

7. The method of claim 4, wherein:
the linear intervals are signaled using syntax fields including a first field indicating a number of linear intervals and a second field indicating a scaled value corresponding to each of the linear intervals.

8. The method of claim 7, wherein:
the syntax fields further include a third field indicating a start depth value to which the piecewise linear scaling is applied.

9. A method for inverse scaling of a geometry atlas, performed in an immersive video decoder, comprising:
restoring geometry atlases; and
generating min-max normalized depth values by performing inverse scaling on the geometry atlases so as to correspond to gradients of multiple linear intervals.

10. The method of claim 9, wherein:
the linear intervals are generated by dividing an entire range corresponding to the min-max normalized depth values into equal intervals.

11. The method of claim 9, further comprising:
generating a virtual view image using the min-max normalized depth values.

12. The method of claim 9, wherein:
the gradients are set based on sample occurrence frequencies in the linear intervals.

13. The method of claim 12, wherein:
each of the gradients is set such that more bits are assigned as the sample occurrence frequency is higher.

14. The method of claim 12, wherein:
the linear intervals are signaled using syntax fields including a first field indicating a number of linear intervals and a second field indicating a scaled value corresponding to each of the linear intervals.

15. The method of claim 14, wherein:
the syntax fields further include a third field indicating a start depth value to which piecewise linear scaling is applied.

16. An apparatus for piecewise linear scaling, comprising:
memory in which at least one program is recorded; and
a processor for executing the program,
wherein the program includes instructions for performing generating min-max normalized depth values; and
generating geometry atlases by scaling the depth values so as to correspond to gradients of multiple linear intervals.

17. The apparatus of claim 16, wherein:
the linear intervals are generated by dividing an entire range corresponding to the min-max normalized depth values into equal intervals.

18. The apparatus of claim 16, wherein:
the gradients are set based on sample occurrence frequencies in the linear intervals.

19. The apparatus of claim 18, wherein:
each of the gradients is set higher as the sample occurrence frequency is higher.

20. The apparatus of claim 18, wherein:
the linear intervals are signaled using syntax fields including a first field indicating a number of linear intervals and a second field indicating a scaled value corresponding to each of the linear intervals.

* * * * *